US012483837B2

(12) United States Patent
Mordechai

(10) Patent No.: US 12,483,837 B2
(45) Date of Patent: Nov. 25, 2025

(54) SPEAKER DRIVER ASSEMBLY

(71) Applicant: Morel (IL) Ltd., Ness Ziona (IL)

(72) Inventor: Oren Mordechai, Ness Ziona (IL)

(73) Assignee: MOREL (IL) LTD., Ness Ziona (IL)

( * ) Notice: Subject to any disclaimer, the term of this patent is extended or adjusted under 35 U.S.C. 154(b) by 183 days.

(21) Appl. No.: 18/487,089

(22) Filed: Oct. 15, 2023

(65) Prior Publication Data

US 2025/0126411 A1 Apr. 17, 2025

(51) Int. Cl.
*H04R 9/02* (2006.01)
*H04R 9/06* (2006.01)

(52) U.S. Cl.
CPC .............. *H04R 9/027* (2013.01); *H04R 9/06* (2013.01)

(58) Field of Classification Search
CPC .......... H04R 9/027; H04R 9/06; H04R 9/043; H04R 9/045; H04R 7/04
See application file for complete search history.

(56) References Cited

U.S. PATENT DOCUMENTS 12,126,981 B1 * 10/2024 Mettler .................... H04R 9/06

* cited by examiner

*Primary Examiner* — Sunita Joshi
(74) *Attorney, Agent, or Firm* — Dekel Patent Ltd.; David Klein

(57) ABSTRACT

A speaker driver assembly includes a voice coil coupled to a magnet motor structure, a cone coupled to the voice coil, the cone and the voice coil being mounted in a basket, a surround and a spider coupled to the basket. Rims of the surround and of the spider are mounted on an annular shelf formed on the basket.

10 Claims, 3 Drawing Sheets

SPEAKER DRIVER ASSEMBLY

FIELD OF THE INVENTION

The present invention relates generally to audio speaker drivers, and particularly to a speaker driver assembly that has a novel construction of the spider and surround.

BACKGROUND OF THE INVENTION

Speaker drivers are electro-acoustic converters, which accept electric signals and convert them into sound waves. A conventional speaker driver has a magnetic circuit provided in a frame or chassis, covered by a diaphragm. A voice coil is movably disposed within a gap in the magnetic circuit, wherein the edge of the voice coil is attached to the diaphragm. The term "speaker driver" encompasses drivers over a complete range of all frequencies, including a woofer and subwoofer covering the low frequency ranges, and a midbass, midrange, tweeter covering high-frequency ranges.

In the speaker driver, electrical impulses are produced that alternate from positive to negative voltages and create an electromagnet when they reach a voice coil (a spool of wire) inside the speaker. The voice coil is suspended between pole pieces of a permanent magnet motor structure. This voice coil is attached to a diaphragm or membrane, which is typically a cone or moving mass assembly mounted to a frame that is fixed to the motor structure. The voice coil reciprocates (i.e., moves the membrane back and forth) in a linear path as the alternating current flows through the voice coil that is centered in the magnetic gap (between the two poles).

The circumference of the membrane (cone) is affixed to a "surround" or suspension, which is affixed to a frame or basket, and which is generally constructed of a metal. The magnet is typically mounted to the rear of the frame behind the cone. The surround is generally a circular half-roll of flexible material that joins the top of the cone and the speaker's frame.

A spider, which is a circle of flexible corrugated material, joins the bottom of cone to the speaker's frame. The surround and spider center the cone/moving mass assembly and restore it to its original position. The peak-to-peak distance traveled by the cone is known as the "excursion".

Accordingly, in the prior art, the spider and the surround are attached to two different attachment (or "landing") planes. As noted above, the attachment plane of the surround is at the top of the cone and the attachment plane of the spider is at the bottom of the cone, typically on a ring between the membrane and the upper pole plate.

SUMMARY

The present invention seeks to provide a speaker driver assembly that has a novel construction, as described in detail below. In the speaker driver of the invention, the spider and the surround are either directly attached to the same attachment plane or separated by a relatively thin layer, such as a thin spacer. In any case, in the speaker driver of the invention, the outer diameter of the spider rim and the surround rim are either identical or their diameters are within 20% of each other. The speaker driver of the invention is applicable for any frequency range, such as but not limited to, woofer, subwoofer or tweeter.

There is provided in accordance with a non-limiting embodiment of the invention a speaker driver assembly including a voice coil coupled to a magnet motor structure, a cone coupled to the voice coil, the cone and the voice coil being mounted in a basket, a surround and a spider coupled to the basket, wherein rims of the surround and of the spider are mounted on an annular shelf formed on the basket.

In accordance with a non-limiting embodiment of the invention, the rim of the spider is mounted directly to the rim of the surround. In another embodiment, the rim of the spider is mounted to the rim of the surround by means of an intermediate layer, such as a spacer or glue layer, placed between the rim of the spider and the rim of the surround.

BRIEF DESCRIPTION OF DRAWINGS

The present invention will be understood and appreciated more fully from the following detailed description, taken in conjunction with the drawings in which.

DETAILED DESCRIPTION

Figure 1:
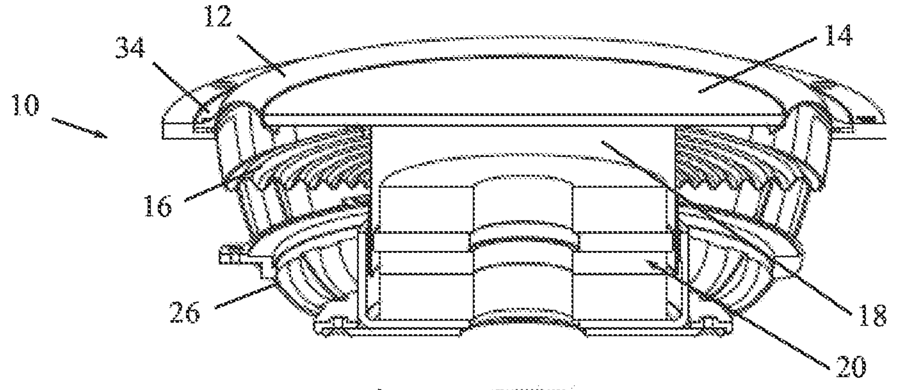
FIGS. 1 and 2 are simplified perspective and exploded illustrations of a speaker driver assembly, in accordance with a non-limiting embodiment of the invention.
Figure 2:
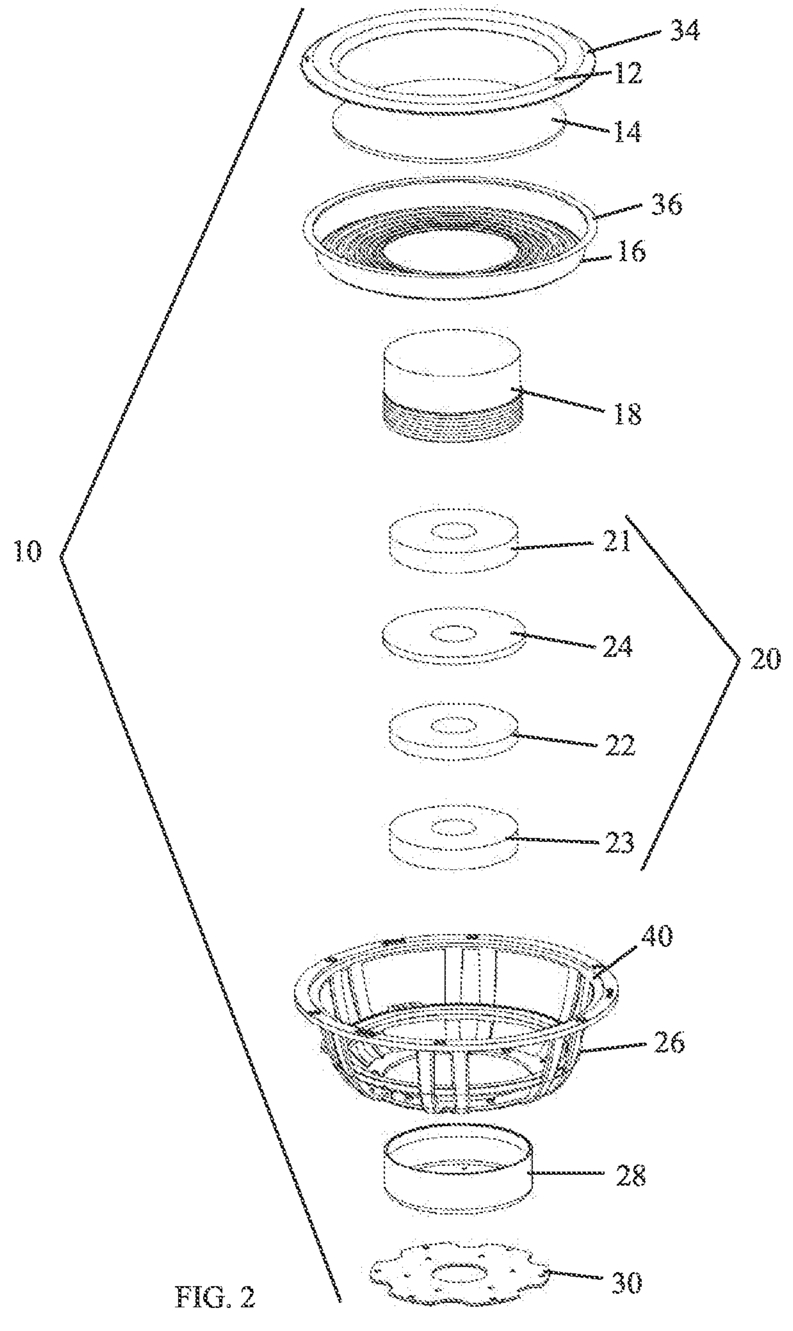

Reference is now made to FIGS. 1 and 2, which illustrate a speaker driver assembly 10, in accordance with a non-limiting embodiment of the invention.

As seen best in FIG. 2, speaker driver assembly 10 may include a surround 12, a cone 14 (the terms cone, diaphragm, and membrane being used interchangeably throughout), a spider 16, and a voice coil 18 coupled to a magnet motor structure 20. The magnet motor structure 20 may include first, second and third magnets 21, 22, and 23, respectively, which are preferably permanent magnets. The first and second magnets 21 and 22 may be separated by a top plate 24. It is appreciated that the invention is not limited to this particular construction of the magnet motor structure 20, and other numbers of magnets and plates may be used. The voice coil 18 is coupled to cone 14. Without limitation, voice coil 12 may have a diameter of 12.7 cm.

Speaker driver assembly 10 may also include a basket 26 (also called chassis). Basket 26 may be constructed with openings to provide good ventilation. The bottom of basket 26 may include a cup 28 (typically made of metal) and a butterfly 30, which serves as an acoustic closure to the bottom of the basket.

Cone 14 may be a flat membrane or any other shape, as illustrated (as opposed to a cone shape). For achieving the required stability and rigidity, the flat cone 14 may be constructed as a honeycomb and made of a material with good thermal conductivity, such as an aluminum alloy. This construction provides excellent heat transfer to cool voice coil 18.

Figure 3:
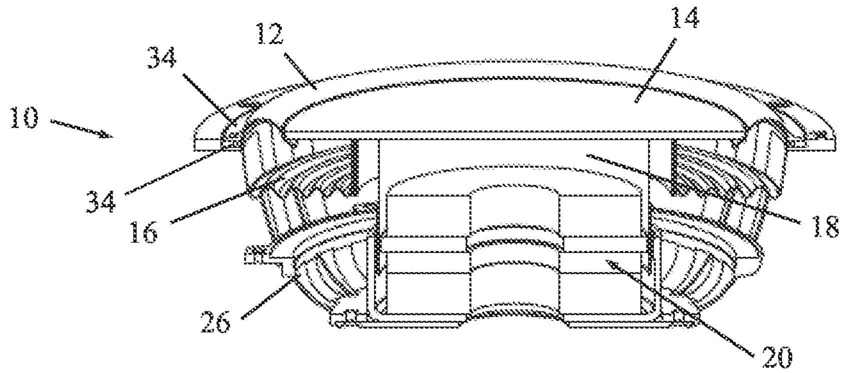
FIGS. 3 and 4 are simplified perspective and exploded illustrations of a speaker driver assembly, in accordance with another non-limiting embodiment of the invention.
Figure 4:
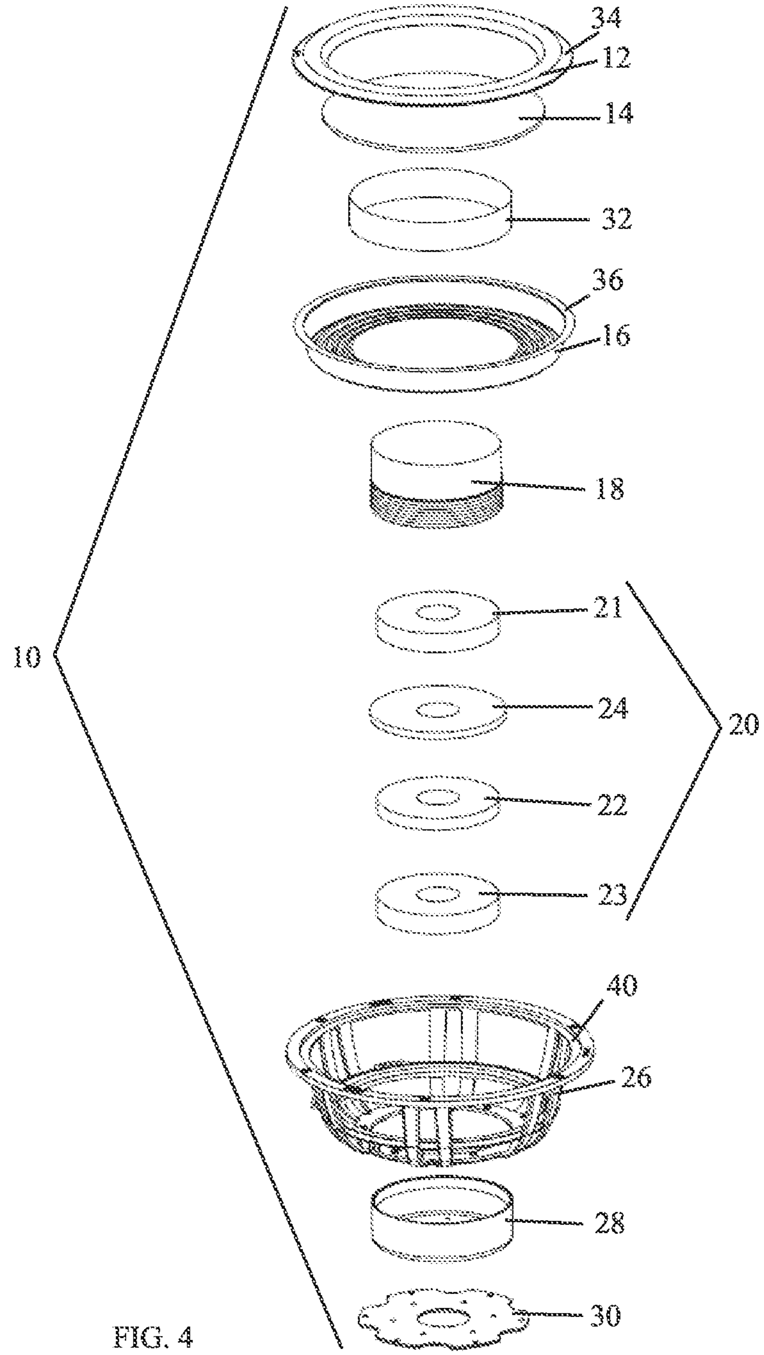

Reference is now made to FIGS. 3 and 4. This is a different version of speaker driver assembly 10 (with like elements being designated by like reference numerals), the difference being the addition of a stabilizing spider ring 32 assembled in the center of the spider 16.

In the non-limiting illustrated embodiments of FIGS. 1-4, surround 12 has a rim 34, and spider 16 has a rim 36. In contrast with the prior art, as seen best in FIG. 5, the rim 36 of spider 16 is mounted to the rim 34 of surround 12. In one embodiment, surround 12 and spider 16 are directly attached to the same attachment plane; in other words, the rim 36 of spider 16 is mounted directly to the rim 34 of surround 12, such as by bonding (mechanical connection of some sort) or otherwise joining rim 36 directly to rim 34. In such an embodiment, the surround is attached directly to the spider. In another embodiment, the rim 36 of spider 16 is mounted to the rim 34 of surround 12 by means of an intermediate layer 38, such as a spacer or glue layer, placed between the rim 36 of spider 16 and the rim 34 of surround 12. The assembly of surround 18 and spider 20 may be affixed to an annular shelf 40 formed on basket 26. Rim 36 of spider 16 is thus coupled to the annular shelf 40 of basket 26. This allows use of a larger spider than the prior art. Accordingly, in accordance with one embodiment of the invention, the outer diameter of the spider rim 36 and the surround rim 34 are identical. In accordance with another embodiment of the invention, the outer diameter of the spider rim 36 and the surround rim 34 are within 5% of each other. In accordance with another embodiment of the invention, the outer diameter of the spider rim 36 and the surround rim 34 are within 10% of each other. In accordance with another embodiment of the invention, the outer diameter of the spider rim 36 and the surround rim 34 are within 20% of each other.

The intermediate layer 38 is a relatively thin layer. Without limitation, the thickness of intermediate layer 38 is not more than the thickness of either rim 36 of spider 15 or rim 34 of surround 12.

Figure 5:
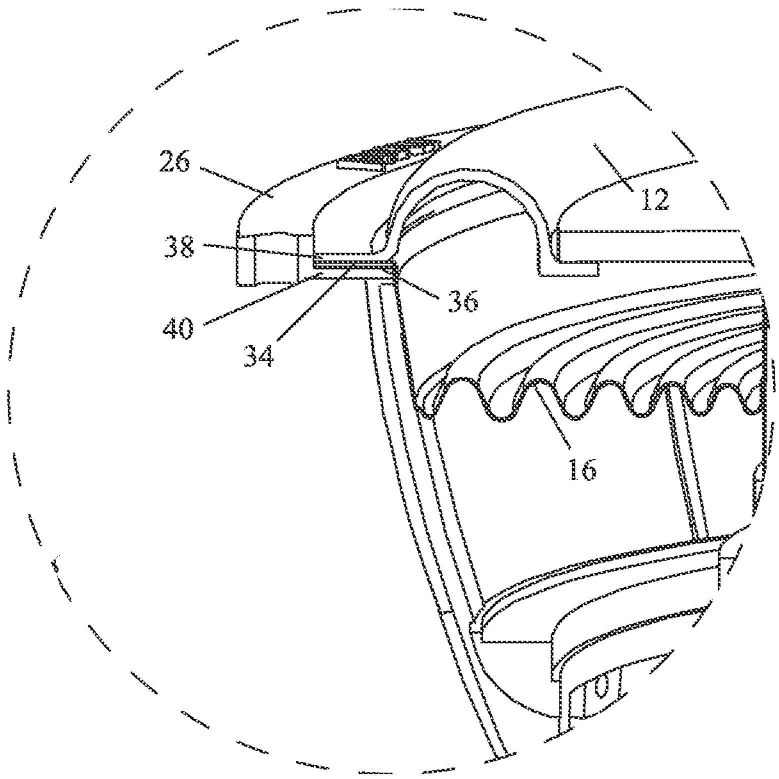
FIG. 5 is an enlarged view of the spider connected to the basket of the speaker driver assembly.

As seen in FIG. 5, the rim 36 of spider 16 follows the shape of the inner annular shelf 40 of basket 26. Without limitation, the finished assembly may have a height (depth) of 8.7 cm.

What is claimed is:

1. A speaker driver assembly comprising:

a voice coil coupled to a magnet motor structure;

a cone coupled to said voice coil, said cone and said voice coil being mounted in a basket;

a surround and a spider coupled to said basket, wherein rims of said surround and of said spider are mounted on an annular shelf formed on said basket, and wherein said rims of said surround and of said spider are attachment planes of said surround and said spider, and said attachment planes of said surround and said spider are either identical or separated from each other by an intermediate layer whose thickness is not more than a thickness of said rim of said spider or said rim of said surround.

2. The speaker driver assembly according to claim 1, wherein said surround is joined to said spider by joining said rim of said surround directly to said rim of said spider.

3. The speaker driver assembly according to claim 1, wherein said rim of said spider is mounted to said rim of said surround by means of said intermediate layer placed between said rim of said spider and said rim of said surround.

4. The speaker driver assembly according to claim 1, wherein outer diameters of said rims of said spider and said surround are identical.

5. The speaker driver assembly according to claim 1, wherein outer diameters of said rims of said spider and said surround are within 5% of each other.

6. The speaker driver assembly according to claim 1, wherein outer diameters of said rims of said spider and said surround are within 10% of each other.

7. The speaker driver assembly according to claim 1, wherein outer diameters of said rims of said spider and said surround are within 20% of each other.

8. The speaker driver assembly according to claim 1, wherein said rim of said spider is shaped to complement a shape of said annular shelf of said basket.

9. The speaker driver assembly according to claim 1, wherein said cone is a flat membrane.

10. The speaker driver assembly according to claim 1, wherein said cone is a flat membrane constructed as a honeycomb.

* * * * *